United States Patent
Springer

(10) Patent No.: US 6,321,262 B1
(45) Date of Patent: Nov. 20, 2001

(54) SYSTEM AND METHOD FOR IDENTIFICATION AND STREAMLINED ACCESS TO ONLINE SERVICES

(75) Inventor: David S. Springer, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/244,473

(22) Filed: Feb. 4, 1999

(51) Int. Cl.[7] .................................................. G06F 15/177
(52) U.S. Cl. .......................... 709/223; 709/220; 709/224
(58) Field of Search .................................. 709/223, 217, 709/229, 218, 227, 222, 228, 219, 224, 220; 707/500.1, 500.2, 513

(56) References Cited

U.S. PATENT DOCUMENTS

| | | |
|---|---|---|
| 5,604,803 | 2/1997 | Aziz . |
| 5,727,156 | 3/1998 | Heri-Hoyman et al. . |
| 5,771,354 | 6/1998 | Crawford . |
| 6,049,671 * | 4/2000 | Slivka et al. ........................ 709/220 |
| 6,073,172 * | 6/2000 | Frailong et al. .................... 709/222 |
| 6,073,214 * | 9/1998 | Fawcett .............................. 711/133 |
| 6,134,592 * | 10/2000 | Montulli ............................ 709/229 |
| 6,167,358 * | 12/2000 | Othmer et al. ...................... 709/217 |
| 6,256,668 * | 10/1998 | Slivka et al. ........................ 709/220 |

FOREIGN PATENT DOCUMENTS

| | | |
|---|---|---|
| 2 345 359 A | 7/2000 | (GB) . |
| WO 98/06055 A1 | 2/1998 | (WO) . |
| WO 98/09243 A1 | 3/1998 | (WO) . |

* cited by examiner

Primary Examiner—Glenton B. Burgess
Assistant Examiner—Chuong Ho
(74) Attorney, Agent, or Firm—Haynes and Boone, L.L.P.

(57) ABSTRACT

This is a system and method for automatically identifying a customer when accessing an online service. The system and method includes: providing general HTML content with tokens for the computer system; providing system information specific to the computer system to a database accessible by the online service; and providing an identification program for the computer system to provide a system ID that uniquely identifies the system information. The system and method also includes loading HTML content on the computer system. The system ID can include a system express service code, a service tag number, or a unique ID from a microprocessor. The system and method also includes displaying computer-specific information on a web page of the online service.

28 Claims, 5 Drawing Sheets

Fig. 6

SYSTEM AND METHOD FOR IDENTIFICATION AND STREAMLINED ACCESS TO ONLINE SERVICES

BACKGROUND

The present invention relates generally to computer systems and more particularly to a system of automatic identification and streamlined access when connecting to an online service.

This application relates to co-pending U.S. patent application Ser. No. 09/012,196, filed on Jan. 23, 1998, entitled System And Method For Preparing A Computer Memory, naming Alan E. Beelitz as inventor. The co-pending application is incorporated herein by reference in its entirety, and is assigned to the assignee of this invention.

This application relates to co-pending U.S. patent application Ser. No. 09/012,962 filed on Jan. 26, 1998, entitled Generation of a Compatible Order For a Computer System, naming Alan E. Beelitz and Paul J. Maia as inventors. The co-pending application is incorporated herein by reference in its entirety, and is assigned to the assignee of this invention.

This application relates to co-pending U.S. patent application Ser. No. 09/009,401, filed on Jan. 19, 1998, entitled Method And Apparatus For Providing And Accessing Data At An Internet Site naming Amy Van Wyngarden as inventor. The co-pending application is incorporated herein by reference in its entirety, and is assigned to the assignee of this invention.

This application relates to co-pending U.S. patent application Ser. No. 09/066,128, filed on Apr. 24, 1998, entitled Method And System For Supplying A Custom Software Image To A Computer System naming Tom Colligan, Jonathan Ellis and Hunter Robertson as inventors. The co-pending application is incorporated herein by reference in its entirety, and is assigned to the assignee of this invention.

This application relates to co-pending U.S. patent application Ser. No. 09/182,403, filed on Oct. 29, 1998, entitled Built-In Automatic Customer Identifier When Connecting to a Vendor Website naming Jon Boede as inventor. The co-pending application is incorporated herein by reference in its entirety, and is assigned to the assignee of this invention.

When an off-the-shelf computer system is purchased, the customer may eventually need to have the system serviced, or may wish to modify and/or enhance the system. In that event, the customer must be sure that system compatible service and/or enhancements are provided. This can be accomplished by identifying the customer's system by model number.

More recently, customers have been purchasing custom created systems as opposed to an off-the-shelf system. This can complicate service and modification of the system. Customers would have to know specifically what the make-up of their custom-built system is, as would the service technician or the vendor of the original system. This can be checked by providing the vendor or service technician with identifying information for the computer, such as a serial or other identification number or the name of the company that purchased the computer, so that the original purchase order or specifications can be referenced to know and understand all the custom features of a particular system.

For example, a customer may call the vendor and request a new or additional part or a replacement part for a custom built system. The vendor will need to reference the original system in order to advise the customer and provide compatible equipment. This is accomplished by the vendor requesting that the customer provide the serial number or other identification number so that the original system may be reviewed and compatible components can be provided. This requires that the customer know or be able to locate the serial number and that the vendor be able to locate sales records and specification data relating to the customer specific system.

After a customer purchases a computer system, he or she may also need to access the vendor by the worldwide web to inquire about service and or further modifications and enhancements available for the customer specific system. This scenario still requires some form of, or exercise in, identifying the original system to avoid substituting or adding parts or enhancements that are not compatible with the original system. An example of a web page 100 for providing such identifying information to the vendor via the worldwide web is shown FIG. 1. As shown in FIG. 1, using the web page 100 a customer enters either a system service tag or express service code in a field 102 and then selects a button 104 labeled "Submit" to submit the information to the vendor. Moreover, the vendor may need the customer to fill in additional information about the customer or the computer that the vendor may already have, but, can not automatically identify with the customer without a unique identifier for the customer's computer system.

Therefore, what is needed is a means for automatically identifying a computer system when the customer connects to a vendor via the worldwide web.

SUMMARY

One embodiment, accordingly, provides software that finds a customer identification number from the computer hardware or software, and then feeds the number into browser software already loaded on a customer's system during a factory pre-install process. The browser software would then include the customer's identification number as a variable for a universal resource locator pre-installed on the system hard drive. To this end, a computer system includes browser software provided on a hard drive in a customer system.

A principal advantage of this embodiment is that when the customer contacts the vendor, the customer does not have to locate the system's serial number or other necessary identifying information and possibly enter the information incorrectly on a form on a web page. The automatic identification of the customer and system to the vendor enables the vendor to provide the customer with information regarding the customer's specific system or the business segment that the customer services.

BRIEF DESCRIPTION OF THE DRAWINGS

FIGS. 4–7 illustrate various exemplary web pages of a vendor website embodying features of a preferred embodiment.

DESCRIPTION OF A EMBODIMENT

Figure 1:
FIG. 1 illustrates a web page of a vendor website for obtaining identifying information for a computer system.

FIG. 1 illustrates a web page of a vendor website for obtaining identifying information for a computer system, as described above.

Figure 2:
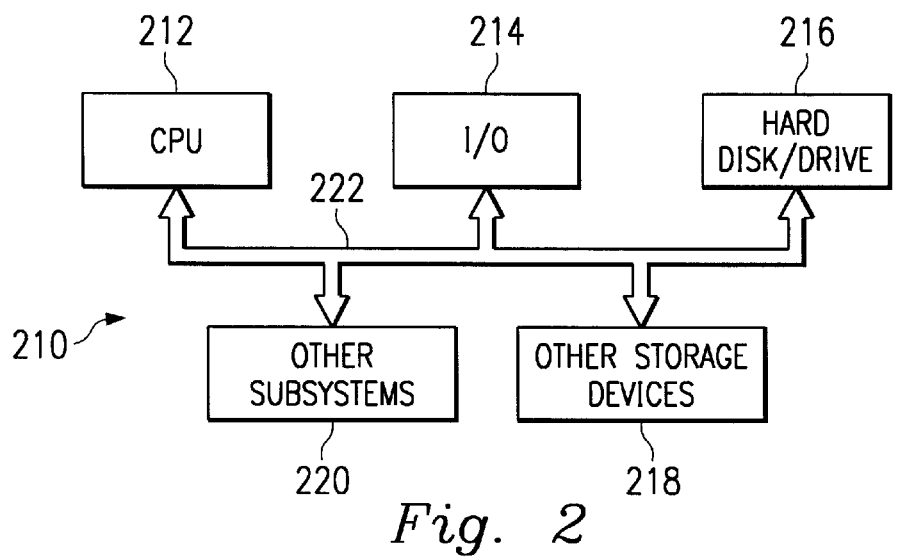
FIG. 2 is a block diagram of an exemplary personal computer system.

FIG. 2 is a system block diagram of a computer system 210 embodying features of a preferred embodiment. The computer system 210 includes a central processing unit ("CPU") 212, I/O devices, such as a display, a keyboard, a mouse, and associated controllers, collectively designated by a reference numeral 214, a hard disk and drive 216 and other storage devices, such as a floppy disk and drive and memory devices, collectively designated by a reference numeral 218, and various other subsystems, collectively designated by a reference numeral 220, all interconnected via one or more buses, shown collectively in FIG. 2 as a bus 222.

Figure 3:
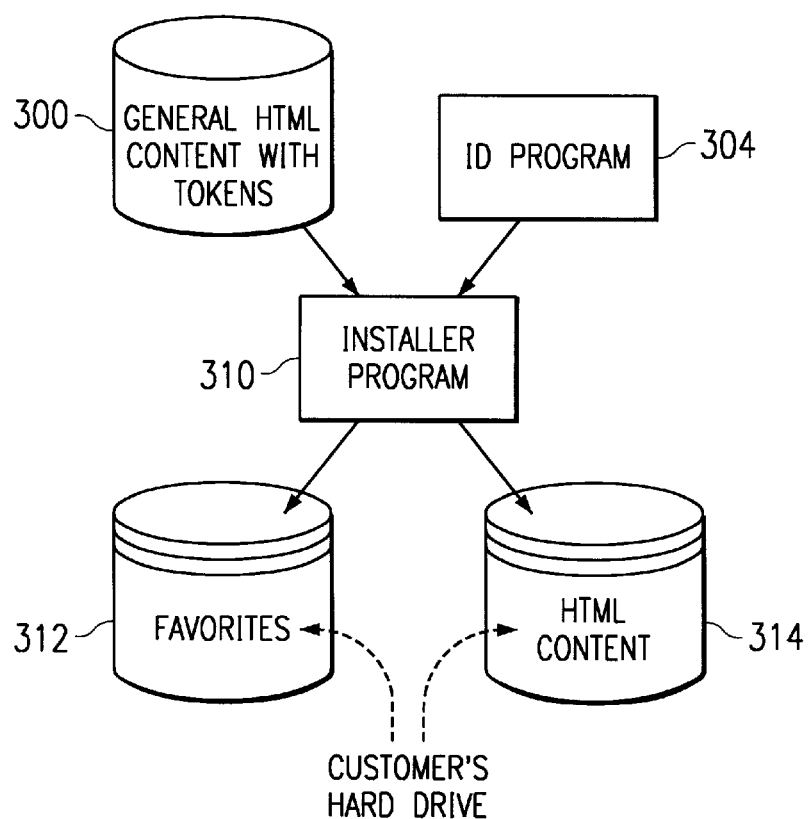
FIG. 3 is a block diagram of an exemplary operation of a preferred embodiment.

FIG. 3 illustrates a factory installation process embodying features of a preferred embodiment. This example assumes that a vendor recorded information specific to the computer system and, optionally, specific to the customer, in a database. The recorded information matches a unique key corresponding to the computer system. During installation of factory-installed software during manufacture of a computer system, such as the computer system 210 (FIG. 2), it is known to install general HTML content with tokens ("general HTML content") 300 onto the system 210. In accordance with a preferred embodiment, the general HTML content 300, along with an identification program 304 that provides a system ID is passed to an installer program 310 to install as part of the "Favorites" and "HTML Content" databases 312, 314, respectively, preinstalled on the hard drive 216 (FIG. 2) of the customer's system 210 (FIG. 2) (system ID will be used throughout the specification to refer to an unique identification key that is used to match a computer to other information recorded at a database of a vendor).

The identification program 304 can provide the system ID by several methods. One example is for the identification program 304 to make a system call to retrieve an identification number of the microprocessor that would have been recorded as an unique key to match up to the customer information recorded at time of order. Another example is for the identification program 304 to retrieve the system express service code stored in either a hard disk or burned into a chip in the computer. This example would use the system express service code as the unique key to match up to the customer information recorded at time of order. Another example would just match the system ID to information on what is installed on the computer, and not any customer information when the computer is an "off-the-shelf" system. Yet another example would retrieve the service tag number as the system ID.

Once the system ID is found, the identification program 304 sets a system variable to equal the system ID. After this variable is set, a command to call a specific uniform resource locator ("URL") referred to as a "GET URL" (provided within the general HTML content of the system 210) will get the specific URL, while providing the system ID as a parameter. That is, in one embodiment, the identification program software 304 finds the customer identification number from the computer hardware, and then outputs the identification number to the browser software on the computer system. In response to receiving the identification number, the browser software includes the identification number as a variable for the specified URL. A web server at the specific URL will then match the system ID to the customer record and display customer and/or computer specific information. Specifically, assuming the system ID is the service tag (which is BGP1X in this example) the installed programs would look like this:
findID( );
mydell.us.dell.com/channel/start.asp?svctag=%SNUM%
and the GET URL command would actual have the service tag as the parameter as displayed below:
mydell.us.dell.com/channel/start.asp?svctag=BGP1X It will be recognized that the above-described installation procedures shown and described with reference to FIG. 3 will be performed whether the computer system 210 is an "off-the-shelf" or "build-to-order" system.

Operation of the preferred embodiment described above will now be illustrated and described with reference to FIGS. 4–7.

Figure 4:
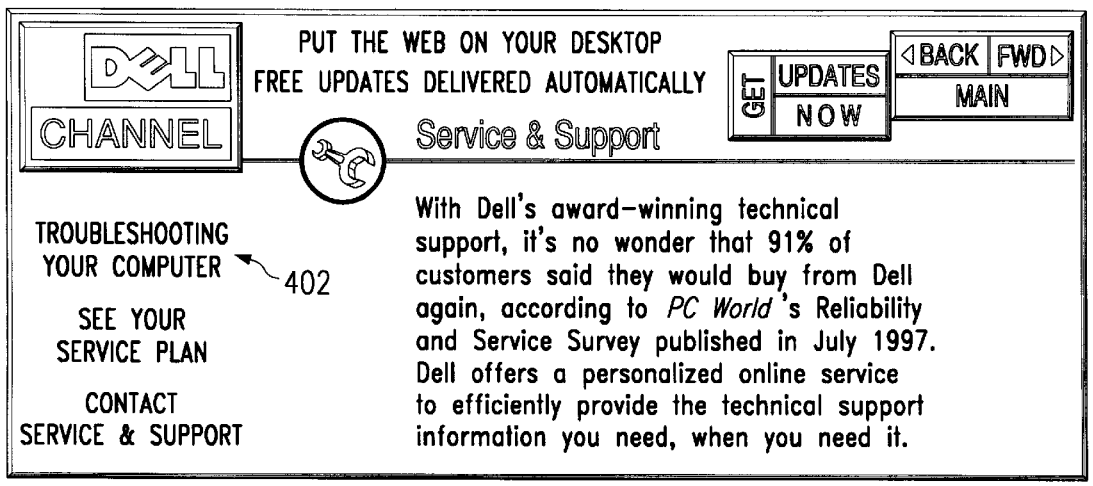

Referring to FIG. 4, a web page 400 is displayed when a customer has taken the appropriate step(s), such as making a selection from a list of "Favorites", or "Bookmarks", used interchangeably, to access vendor service and support via the worldwide web. Selecting the phrase "TROUBLESHOOTING YOUR COMPUTER" 402 results in the display of a web page 500 illustrated in FIG. 5. Using the system ID found previously, the web page fills the system service tag field 502 and express service code field 504 automatically with the system service tag (in this case BGP1X) of the system 210 (FIG. 2), as well as an express service code corresponding to the system service tag (in this case, 19254741). It should be noted that the preferred embodiment described herein enables presentation of the web page 100 (FIG. 1) to be bypassed, as the information normally entered by the customer using the web page 100 is automatically entered by the preferred embodiment herein described.

Figure 6:
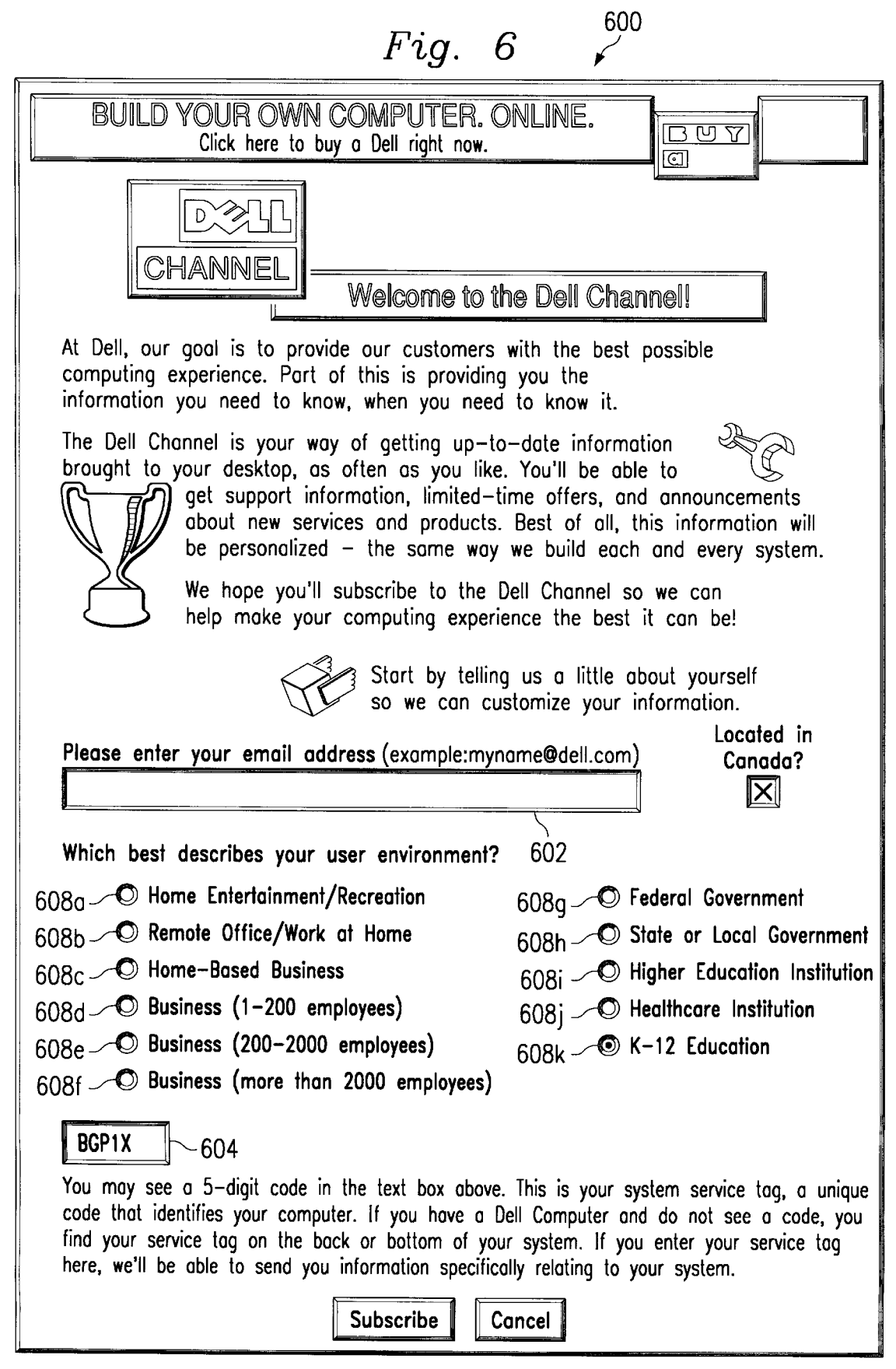

FIG. 6 illustrates a web page 600 used by a customer to subscribe to updates provided by the vendor in connection with the customer's particular system and/or user environment. Again, when this page 600 is accessed, the service tag of the customer's system is automatically entered in a field 602, which field is filled in since the system ID was previously found. In addition, an appropriate one of several "user environment" radio buttons 608a–608k is automatically filled by a customer database lookup matching the respective "company" designation to the system ID. In the example illustrated in FIG. 6, the field 604 contains "BGP1X" and a radio button designated "K-12 Education" 608k, which corresponds to company designation. The example shown in FIG. 6 illustrates again how the opportunity for a customer to make an error in entering identifying information, in this case, service tag and user environment, is eliminated by the automatic provision of this information to the vendor's website.

Figure 7:
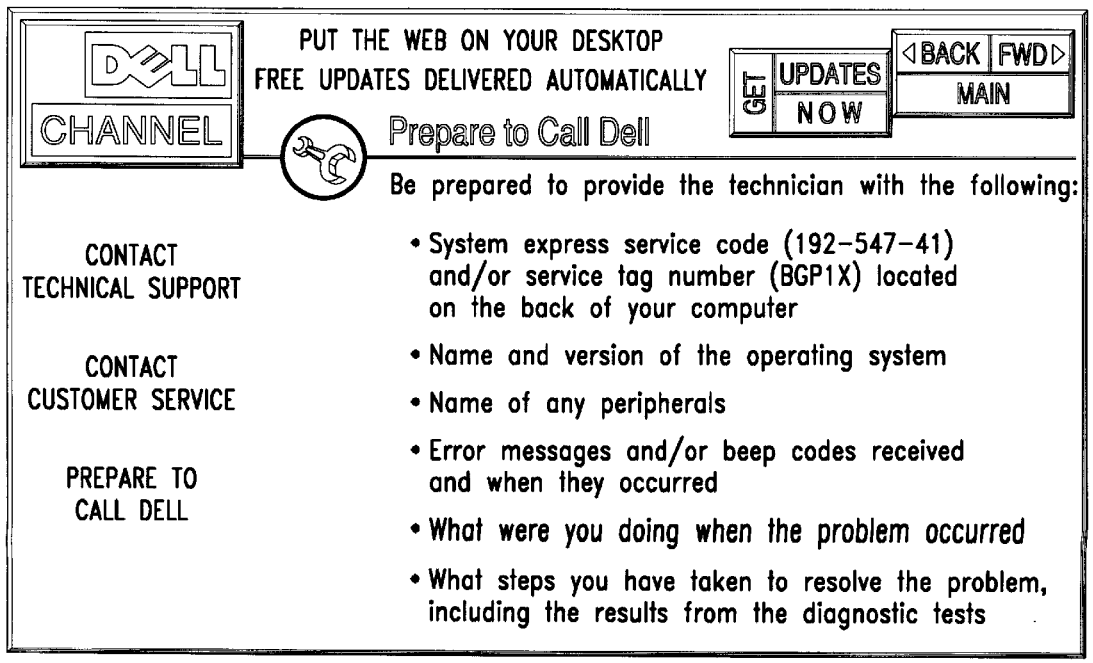
Figure 5:
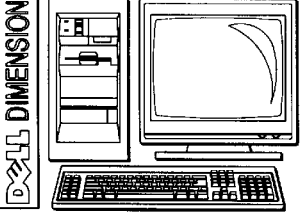

FIG. 7 illustrates yet another use of the preferred embodiment described herein for automatically providing identifying information for a computer and its user; in this case, the information is provided for the benefit of a customer who has decided to contact the vendor via telephone, rather than the worldwide web. As shown in FIG. 7, a web page 700 provides information to a customer on contacting the vendor via telephone. In a first of a series of instructions, the customer is advised to be prepared to provide the vendor with the system service express code and/or service tag number, both of which are provided on the page 700 so that the customer does not need to locate that information on his or her system.

As a result, one embodiment provides a method of providing a computer system with a built-in automatic custom identifier for use in identifying the computer system to a vendor website. Tokens in general HTML are replaced with the system ID found by an identification program. The general HTML content with the system ID is then used to connect to a website that can utilize the system ID to generate system-specific content.

Another embodiment provides a computer system including a processor, a memory, and at least one storage. The computer system further includes a built-in automatic customer identifier for identifying the computer system to a vendor website when the computer system is connected thereto.

As it can be seen, the principal advantages of these embodiments are that when the customer contacts the vendor, the customer does not have to locate the system's serial number or other necessary identifying information and possibly enter the information incorrectly on a form on a web page. The automatic identification of the customer and system to the vendor enables the vendor to provide the customer with information regarding the customer's specific system or the business segment that the customer services. The customer is not required to remember or locate the identifying information for his or her system, as that identifying information is automatically provided to the vendor without customer involvement. Because the customer is not required to type in the necessary identifying information, the risk that errors will be introduced into the information due to typographical errors is effectively eliminated. Also, the customer is not required to read and understand a written explanation of how to find and enter the necessary identifying information, thereby accelerating the process of providing such information to the vendor.

It will be recognized that the automatic provision of the identifying information accomplished by the embodiment described herein enables the vendor website to automatically display on a web page information specific to the computer system 210 (FIG. 2), including, but not limited to, a list of hardware and software components available for repairing or upgrading the computer system and troubleshooting instructions for enabling the customer to determine, and potentially fix, a problem with the computer system.

In addition, the system ID can also be used by a vendor to offer other types of information specifically tailored to the customer. For example, the vendor could display marketing or other types of information specifically chosen because of the type of information collected in the customer database. In sum, many different uses can be found by an online service if it had access to some specific customer information when that customer was accessing its service.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of manufacturing a computer system with a built-in automatic identification program for use in identifying the computer system to an online service, the method comprising:
   providing HTML content and browser software for installation on the computer system;
   providing computer system specific information to a database, the database being accessible to the online service; and
   providing an automatic identification program for installation on the computer system, the automatic identification program supplying, in response to selection of the automatic identification program, a system ID that uniquely identifies the computer system specific information to the online service via the browser software, wherein the online service uses the system ID to access the computer system specific information from the database.

2. The method of claim 1 wherein the HTML content comprises a GET URL.

3. The method of claim 1 wherein the system ID includes a system express service code.

4. The method of claim 1 wherein the system ID includes a service tag number.

5. The method of claim 1 wherein the system ID includes a unique ID from a microprocessor.

6. The method of claim 1 wherein, responsive to connection of the computer system to a website of the online service, a service tag is automatically inserted in at least one appropriate field of a page of the website.

7. The method of claim 1 wherein, responsive to connection of the computer system to a website of the online service, a customer type identifier is automatically provided to the website for enabling selection of a customer environment to be made and displayed on a web page of the online service.

8. The method of claim 1 wherein, responsive to connection of the computer system to a website of the online service, at least one of a plurality of system-specific content is automatically provided to the website and enables the online service to display information specific to the computer system on a web page.

9. The method of claim 8 wherein the information specific to the computer system includes a list of available hardware components.

10. The method of claim 8 wherein the information specific to the computer system includes troubleshooting instructions.

11. The method of claim 8 wherein the information specific to the computer system includes a list of available software components.

12. A system for manufacturing a computer with a built-in automatic identification program for use in identifying the computer to an online service, the system comprising:
    means for providing HTML content and browser software for installation on the computer system;
    means for providing computer system specific information to a database, the database being accessible to the online service; and
    means for providing an automatic identification program for installation on the computer system, the automatic identification program for supplying, in response to selection of the automatic identification program, a system ID that uniquely identifies the computer system specific information to the online service via the browser software, wherein the online service uses the system ID to access the computer system specific information from the database.

13. The system of claim 12 wherein the HTML content includes a GET URL.

14. The system of claim 12 wherein the system ID includes a system express service code.

15. The system of claim 12 wherein the system ID includes a service tag number.

16. The system of claim 12 wherein the system ID includes a unique ID from the microprocessor.

17. The system of claim 12 wherein, responsive to connection of the computer system to a website of the online service, a service tag is automatically inserted in at least one appropriate field of a web page of the online service.

18. The system of claim 12 wherein, responsive to connection of the computer to the online service, a customer type identifier is automatically provided to the online service for enabling selection of a customer environment to be made and displayed on a web page of the online service.

19. The system of claim 1 wherein, responsive to connection of the computer to the online service, at least one of a plurality of system-specific content is automatically provided to the online service and enables the online service to display information specific to the computer system on a web page.

20. The system of claim 19 wherein the information specific to the computer includes a list of available hardware components.

21. The system of claim 19 wherein the information specific to the computer includes troubleshooting instructions.

22. The system of claim 19 wherein the information specific to the computer includes a list of available software components.

23. A computer system comprising a processor, a memory device, at least one storage device, browser software stored in said at least one storage device, and a built-in automatic computer system identification program stored in said at least one storage device for identifying the computer system to an online service, said automatic identification program being loadable into said memory device and being executable by said processor for supplying, in response to selection of said automatic identification program, a computer system ID that uniquely identifies computer system specific information to the online service via said browser software, wherein the online service uses the system ID to access the computer system specific information from a database accessible to the online service.

24. The computer system of claim 23 wherein the system ID includes a service tag and wherein the service tag is automatically inserted in at least one appropriate field of a page of the online service.

25. The computer system of claim 23 wherein the system ID includes a customer type identifier and the customer type identifier is automatically provided to the online service for enabling selection of a customer environment to be made and displayed on a web page of the online service.

26. The computer system of claim 23 wherein at least one of a plurality of system-specific content is automatically provided to the online service and at least one of a plurality of system-specific content is displayed on a web page of the online service.

27. The computer system of claim 26 wherein the system-specific content is selected from the group consisting of a list of available hardware components, troubleshooting instructions, and a list of available software components.

28. The computer system of claim 23 wherein the at least one storage device is a hard drive.

* * * * *